US006366747B1

(12) United States Patent
Roller (10) Patent No.: US 6,366,747 B1
(45) Date of Patent: Apr. 2, 2002

(54) CUSTOMIZABLE CONTROL PANEL FOR A FUNCTIONALLY UPGRADABLE IMAGE PRINTING MACHINE

(75) Inventor: George J. Roller, Penfield, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/339,767

(22) Filed: Jun. 24, 1999

(51) Int. Cl.⁷ .............................................. G03G 15/00
(52) U.S. Cl. ...................................... 399/110; 399/113
(58) Field of Search ................................ 399/110, 113, 399/114, 107, 1, 2

(56) References Cited

U.S. PATENT DOCUMENTS

| 5,146,615 A | * | 9/1992 | Hodsdon et al. ............ 345/168 |
| 5,229,925 A | * | 7/1993 | Spencer et al. ............. 361/422 |
| 5,454,067 A | * | 9/1995 | Tsai ............................... 399/1 |
| 5,604,860 A | | 2/1997 | McLaughlin et al. ........ 395/326 |
| 5,630,079 A | | 5/1997 | McLaughlin ................ 395/335 |
| 5,717,439 A | | 2/1998 | Levine et al. ................ 345/353 |
| 5,881,333 A | * | 3/1999 | Takahashi et al. ............. 399/2 |
| 5,881,340 A | | 3/1999 | Stickney et al. ............ 399/110 |
| 5,884,123 A | | 3/1999 | Stickney et al. ............ 399/107 |

* cited by examiner

Primary Examiner—Quana M. Grainger
(74) Attorney, Agent, or Firm—Perman & Green, LLP (57) ABSTRACT

A reproduction machine has one or more of the following functions: electronic printer, copier, facsimile machine, or optical scanner. A customizable control panel allows functional upgradability of image printing machine. The machine is upgradable to include any of the functions it does not already posses or enhancements thereof. The customizable control panel is preferably employed in an electrostatographic machine. The control panel is upgradable to a different interchangeable control panel by replacement with a different panel or by the addition of a further user interface panel module. A process provides for upgrading a reproduction machine having one or more of the following functions: electronic printer, copier, facsimile machine, or optical scanner, to include any or all of such functions it does not already posses.

14 Claims, 5 Drawing Sheets

CUSTOMIZABLE CONTROL PANEL FOR A FUNCTIONALLY UPGRADABLE IMAGE PRINTING MACHINE

BACKGROUND OF THE INVENTION

1. Field of the Invention

This invention relates to an image printing machine having a customizable control panel. The machine can be upgraded by the user or at the manufacturing plant to include additional functions such as, facsimile, copying and scanning. The control panel is easily upgraded by replacement or by the addition of modular add on panels. The invention is preferably applied to compact reproduction machines constructed from mutually aligning modules and particularly such a machine with a separately framed self aligning control panel.

2. Prior Art

Compact modular reproduction machines having separately framed mutually aligning modules are known as set forth in U.S. Pat. Nos.: 5,881,340 and 5,884,123 to Stickney et al. In accordance with these patents, there is provided a compact electrostatographic reproduction machine, comprising a platen for positioning a document sheet having an original image to be reproduced; and a plurality of separately framed, mutually aligning machine modules variously containing electrostatographic process elements and subassemblies.

Reproduction machines having customizable interface controls are also known as set forth in U.S. Pat. Nos.: 5,604,860 to McLaughlin et al., U.S. Pat. No. 5,630,079 to McLaughlin and U.S. Pat. No. 5,717,439 to Levine et al. In accordance with these patents an a interface control is customized from a user display in various ways. This electronic approach to changing the user interface is appropriate for complex high end machines or networks of machines offering a variety of functions, however, it would be unduly expensive for use with a compact machine.

Multifunction machines employing ink jet or electrostatographic printing having at least two or more functions selected from: electronic printing, copying, faxing, and scanning are also known. The machines of this type which do not include all of such functions are not usually upgradable to include additional functions.

The Xerox 212 and 214 digital copiers have a modular platform analogous to the approach of the Stickney et al. Patents, that allows them to be easily assembled. It is known in the copier art to interchange, by a user, different size paper trays (feeder modules) that interact with a microprocessor in the copier control system. It is also known in the copier art for a service technician to upgrade a copier by adding a duplex module (for two sided copying). However, in these approaches the user interface panel is not generally changed.

In a more remote sense it is also known to remove a car stereo user interface plate for security. There are also TVs with remote controls that, when attached to the TV, also function as a control panel.

SUMMARY OF THE INVENTION

In accordance with this invention there is provided a customizable control panel for a functionally upgradable image printing machine. This invention provides an approach for achieving the lowest possible control panel/user interface cost for an entry level digital device while providing the flexibility for user or factory upgrades to multifunctionality requirements.

In accordance with a preferred embodiment of this invention a reproduction machine is provided having one or more of the following functions: electronic printer, copier, facsimile machine, or optical scanner. The machine is upgradable to include any of the functions it does not already posses or enhancements thereof.

The machine in accordance with this embodiment, preferably includes the following elements: (a) a device for receiving a document image in an electronic format and for transferring the document image in viewable form to a substrate; (b) a device for controlling the document image receiving and transferring device to provide one or more desired machine functions selected from optical scanning, electronic printing, copying, facsimile, improvements to the foregoing functions, or a combination of these functions, the control device being capable of being upgraded to provide one or more the functions it does not posses; and (c) a detachable user interface panel device coupled to the controlling device, the user interface panel device being selected from one of the following interchangeable user interface panel devices: (i) a scanner user interface panel device, (ii) an electronic printer user interface panel device, (iii) a copier user interface panel device, (iv) a facsimile machine user interface panel device, or (v) a user interface panel device configured to include a combination of at least two of the scanner, printer, copier or facsimile functions; the selected user interface panel being upgradable to a different one of the interchangeable user interface panel devices by replacement with a different user interface panel device or by the addition of a further modular user interface panel device.

Preferably the detachable user interface panel device comprises a detachable panel supporting: a plurality of buttons for actuation by the user, a display for communicating with the user, a local microprocessor for assisting the controlling device in providing the desired machine functions and an electrical connector for harnesslessly connecting the panel device and the elements it supports to the controlling device.

The customizable control panel of this invention is preferably employed in an electrostatographic machine although any desired digital printing approach as are known in the art could be employed, including without limitation, ink jet, dye sublimation and hot wax systems.

In accordance with an alternative embodiment of the invention a process is provided for upgrading a reproduction machine having one or more of the following functions: electronic printer, copier, facsimile machine, or optical scanner. The machine is upgradable to include any of the functions it does not already posses.

The process comprises: providing a reproduction machine as described above; upgrading the controlling device by adding additional control elements to so that it can support additional desired functions not already possessed by the machine; and upgrading the detachable user interface panel by removing it and replacing it with a different user interface panel device which is configured to include the additional desired functions not already possessed by the machine or by adding an additional detachable user interface panel element to the original interface panel.

DETAILED DESCRIPTION OF THE INVENTION

While the present invention will be described in connection with a preferred embodiment thereof, it will be understood that it is not intended to limit the invention to that embodiment. On the contrary, it is intended to cover all alternatives, modifications, and equivalents as may be included within the spirit and scope of the invention as defined by the appended claims.

Figure 1:
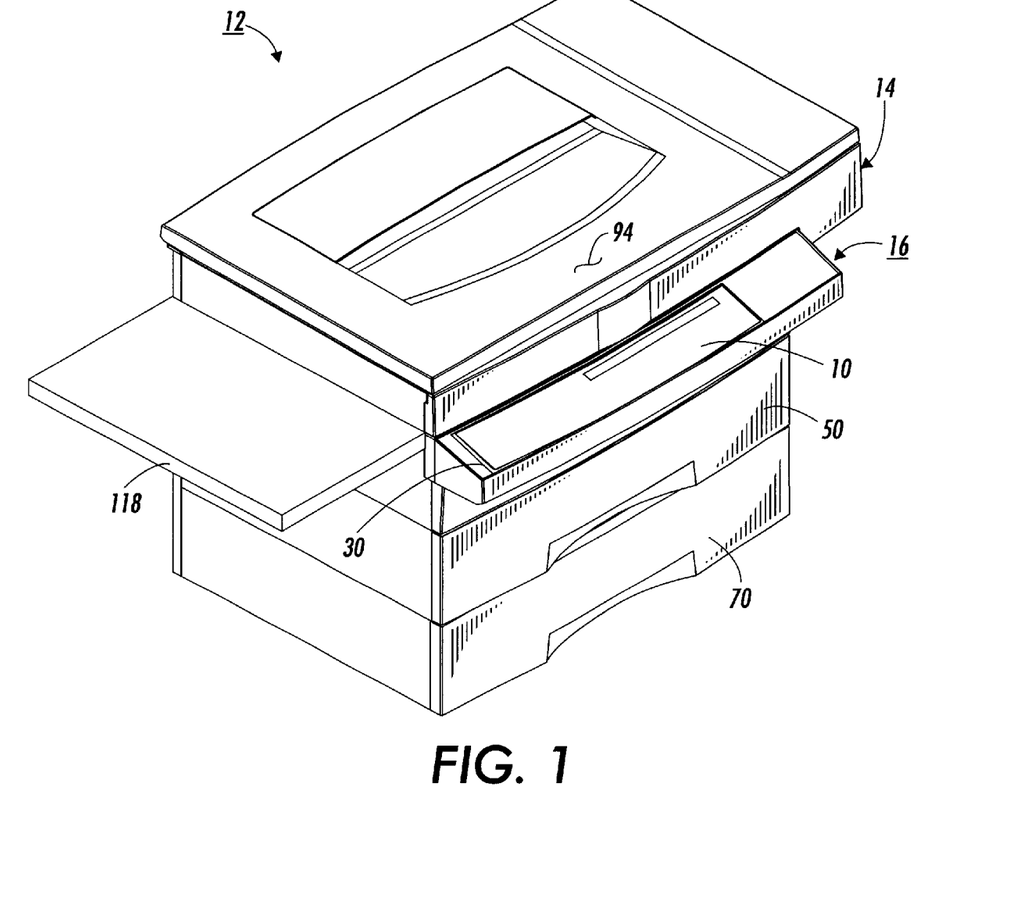
FIG. 1 is a perspective view of a reproduction machine in accordance with a preferred embodiment of this invention including a customizable control panel.

Referring to FIG. 1 in accordance with this invention there is provided a customizable control panel 10 for a functionally upgradable image printing machine 12. This invention provides an approach for achieving the lowest possible control panel 10 (user interface) cost for an entry level digital printing machine 12 while providing the flexibility for user or factory upgrades to multifunctionality requirements.

The trend in SOHO (small office/home office) office equipment 12 is away from single use devices and towards multifunctionality including, for example, copying, printing, faxing and scanning-to-file. In accordance with this invention this is accomplished through a very customer friendly approach which allows the customer to purchase only those functions that the customer needs at the time. When the customer needs additional functions they are provided through easily installed upgrade kits. The machine 12 of this invention has an architecture and design which incorporates the minimum functionality required to allow the machine 12 to function as a very competent digital printer or copier. This enables the machine 12 to have a low cost which permits its sale into the indirect retail channels.

Upgrades to increase functionality, such as for example, enhanced image processing features, printer emulations, scan-to-file, fax and other connectivity, are enabled through customer purchasable and installable upgrade kits which include an upgrade to the control panel, and may include additional machine modules, circuit boards and software. The PC (personal computer) industry today allows upgradability in a somewhat similar fashion, however, reproduction machines have not achieved this type of flexibility. In accordance with this invention the customer can upgrade the capabilities of its reproduction machine 12 whenever the customer desires to do so.

The simplest (least expensive and least complex) type of original reproduction machine 12 would be a printer. However, the original base machine 12 could have any desired function or combination of functions. The modular approach of this invention can also be used in the factory to customize a product before it is shipped.

Figure 2:
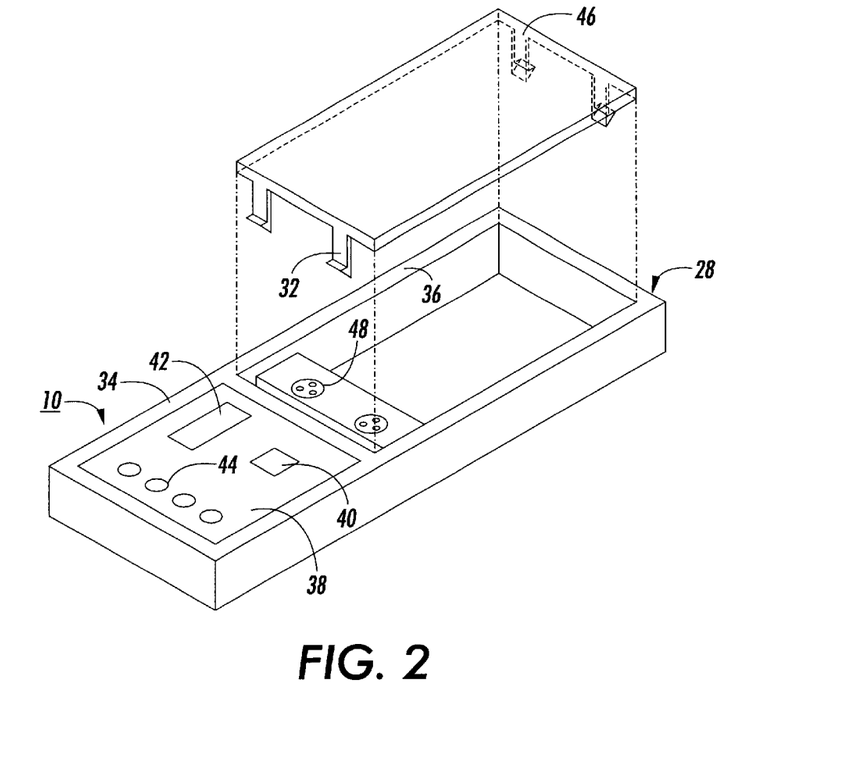
FIG. 2 is an exploded perspective view of separately framed customizable control panel device in accordance with a preferred embodiment of this invention.
Figure 3:
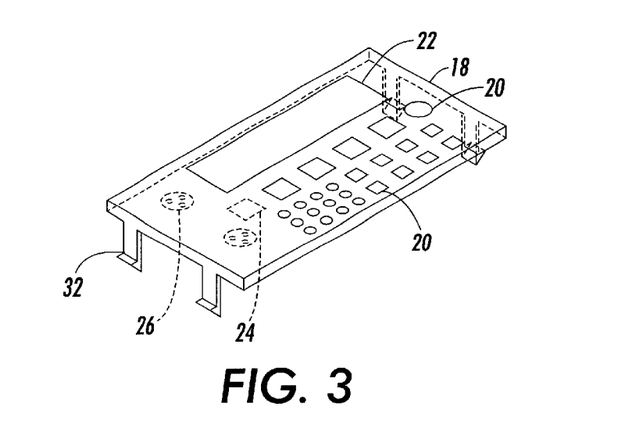
FIG. 3 is a perspective view of an add on control panel device for use in upgrading the control panel device of FIG. 2.

Referring now to FIGS. 1–3 In accordance with a preferred embodiment of this invention a reproduction machine 12 is provided having one or more of the following functions: electronic printer, copier, facsimile machine, optical scanner or other desired function or enhancement. The machine 12 is upgradable to include any of the functions it does not already posses as well as improvements to any of these functions. The machine 12 in accordance with this embodiment, preferably includes the following elements:

(a) A device 14 for receiving a document image in an electronic format and for transferring the document image in viewable form to a substrate (not shown).

(b) A device 16 for controlling the document image receiving and transferring device 14 to provide one or more desired machine 12 functions selected from optical scanning, electronic printing, copying, facsimile, improvements to the foregoing functions, or a combination of these functions. The control device 16 is capable of being upgraded to provide one or more of the functions it does not posses.

(c) A detachable user interface panel device 10 is coupled to the controlling device 16. The user interface panel device 10 is selected from one of the following interchangeable user interface panel devices 10: (i) a scanner user interface panel device (not shown), (ii) an electronic printer user interface panel device 10, (iii) a copier user interface panel device 18, (iv) a facsimile machine user interface panel device (not shown), or (v) a user interface panel device configured to include a combination of at least two of the scanner, printer, copier or facsimile functions or enhancements to such functions. The selected user interface panel device 10 is upgradable to a different one of the interchangeable user interface panel devices by replacement with a different user interface panel device (not shown) or by the addition of a further modular user interface panel device such as device 18.

In a particularly preferred embodiment the detachable user interface panel device 10 comprises a detachable user interface panel module 18 supporting: a plurality of buttons 20 for actuation by the user, a display 22 for communicating with the user, a local microprocessor 24 coupled to the controlling device for assisting the controlling device 16 in providing the desired machine 12 functions and an electrical connector 26 for preferably harnesslessly connecting the panel device 10 and the elements it supports to the controlling device 16.

A frame 28 is provided for supporting the detachable user interface panel device 10. It is sized and shaped to fit into a receiving area 30 of a base machine 12 frame (not shown) or at an appropriate modular receiving area as defined by the machine 12 elements. Preferably the user interface panel device includes a separate frame 28 and is arranged to mutually align with the controlling device 16 machine module in accordance with the teachings of the Stickney et al. Any suitable mechanical retention system for the panel device 10 could be used, such as a snap-fit mounting 32 as shown. The buttons 20 will vary in number and arrangement depending upon what features are to be included.

In this embodiment as shown in FIGS. 2 and 3 a modular upgrade approach is used. The frame 28 is divided into two sections 34 and 36. The first section 34 includes a user interface panel 38 configured to support the base machine 12 functions. The base panel 38 may or may not be detachable for upgrading. If it is detachable then the entire panel 10 may be removed and an upgraded panel inserted in its place.

The base machine 12 panel 38 includes a button 40, a display 42 and various indicator lights 44 appropriate for a computer printer. The panel 38 could have any desired number and shapes of buttons 40, displays 42 and indicator lights 44. In a simple printer 12 the button 40 could be an on/off button. The display could be a one line display indicating printer status, failure codes or other desired information as are commonly provided. The indicator lights 44 could, for example, show that the machine 12 is ready for printing, out of paper, or any other desired information as are commonly provided. When the base machine 12 is shipped in this embodiment the other section 36 of the frame 28 is filled in by a dummy cover 46 having a snap fit mounting 32.

To upgrade the detachable panel 10 of this embodiment of the invention the dummy cover 46 is removed and the modular user interface panel device 18 is inserted in its place. If the base machine 12 is an electronic printer and for example it is being changed to a printer/copier unit, the added buttons 20 might include new copier related functions such as for selecting size enlargement or reduction, number of copies, lighter or darker copies, etc. The display 22 is optional. It could be the one 42 used in the original base machine 12 or the display 22 might be larger and different from the base display 42. For example, when converting an original base machine 12 which has only printer functions to a printer/copier/facsimile machine, the upgraded panel device 10 will preferably have a larger display for displaying long telephone numbers or displaying stored addresses. The microprocessor 24 in the upgraded panel device module 18 will preferably be small to keep the size of the panel 10 small. The electrical connection for the modular panel 18 will preferably be a uniform/standardized approach among the different possible user interface panels 10 such that they can all mate with a common electrical connector 48 supported by the frame 28 and coupled to the controlling device 16. However, multiple connectors 48 as shown could be used if desired. In the simplest connector configuration the user interface panel device connector 26 may only have two male pins to be inserted into two female contacts of the connector 48 on the base machine frame 28. Preferably the connector 26 which is of a harnessless design easily mates with the connector 48 due to the self aligning nature of the user interface panel frame 28. However, any electrical connection system or configuration could be used as are known in the art.

Kits will be offered for sale to people who already have a machine 12 and want to upgrade it to add an additional function or functions . The kit preferably will include a new user interface panel device 10 or module 18 and may include an additional new printed circuit board (PCB) (such as a PCI card). The kit might also have multiples of these two items as well as appropriate software. Preferably the new PCB will include as much of the electronics and software to support the new functions(s) as possible so that the original base machine 12 controller 16 can contain only the electronics and software to operate the base machine 12 and thereby be less expensive. The number of the buttons on the detachable panel and their function and arrangement are selected to provide the desired function or functions. Preferably the display comprises an LCD display having a size and display features appropriate to the desired function or functions.

The customizable control panel 10 of this invention is preferably employed in an electrostatographic machine 12 although any desired digital printing approach as are known in the art could be employed, including without limitation, ink jet, hot wax and dye sublimation.

Referring now to FIGS. 1, 4, 5 & 6 an example of an electrostatographic printer/copying machine 12 which employs the customizable control panel 10 in accordance with a most preferred embodiment of this invention will be illustrated. Such a machine 12 preferably includes at least one copy sheet input element 50 (CIM) for holding and supplying copy sheets 52 to a toner image transfer point 54 of the transfer device 14 to receive a toner image thereon.

Figure 4:
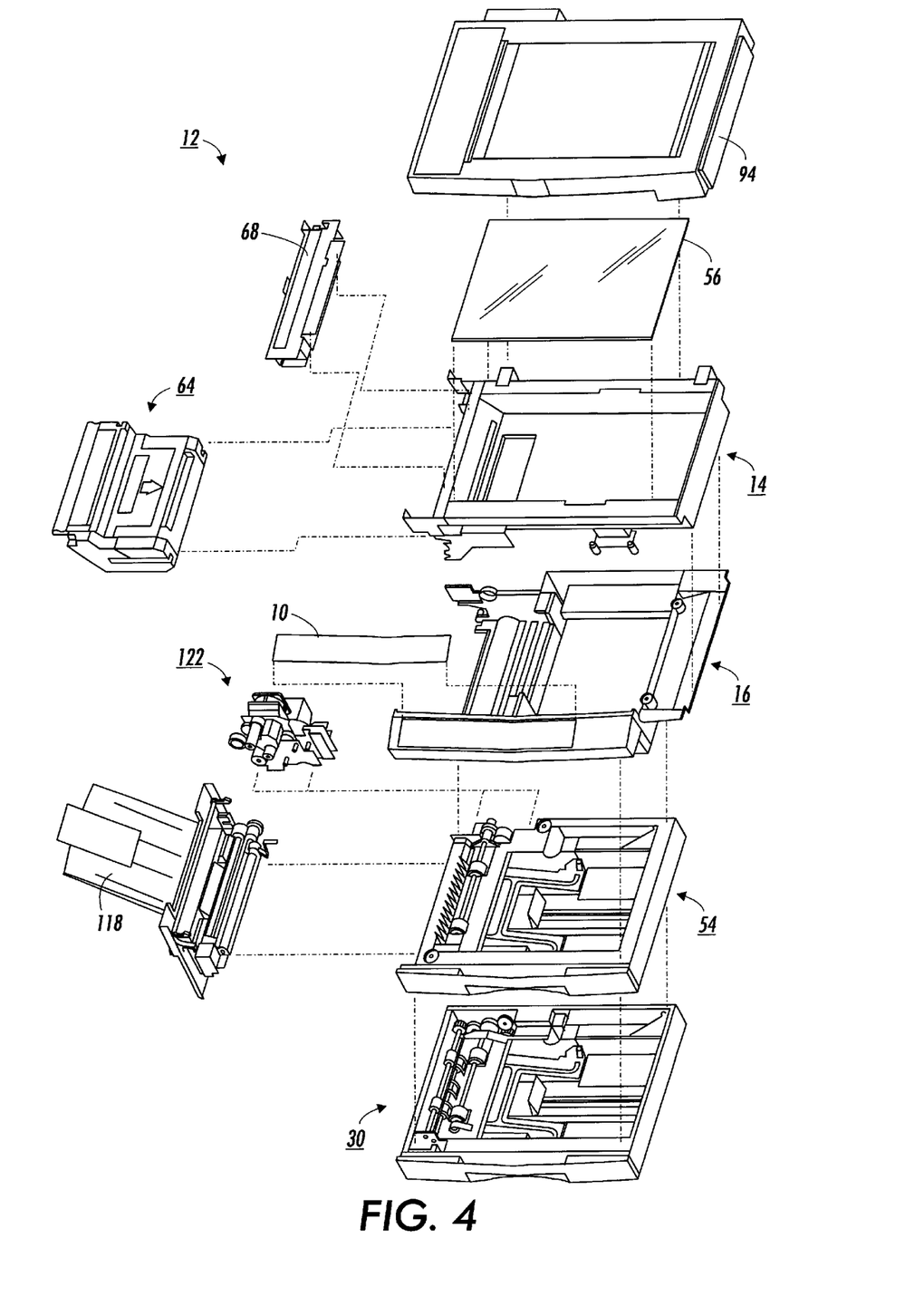
FIG. 4 is an exploded perspective view of the separate modules comprising the machine of FIG. 1.
Figure 5:
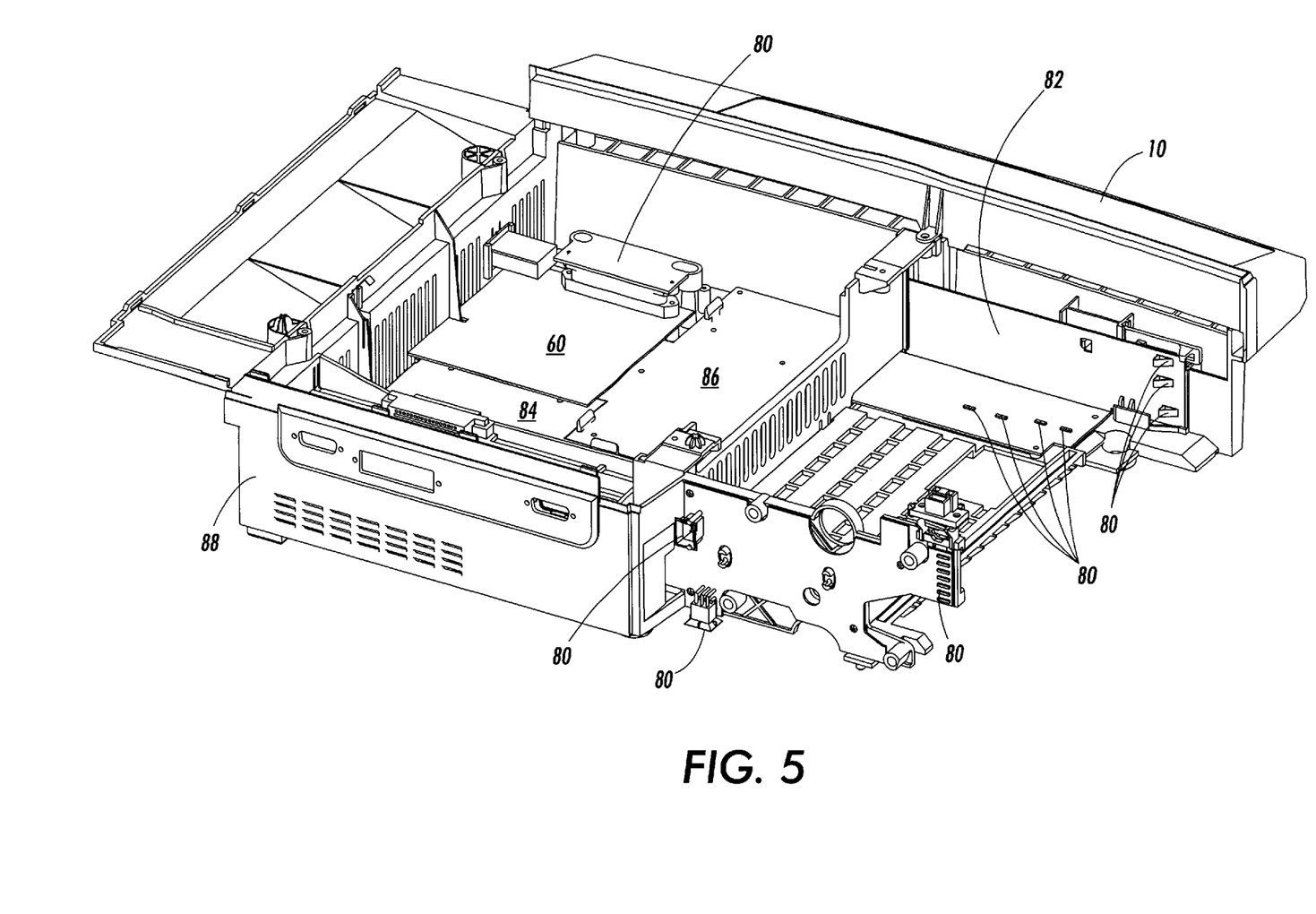
FIG. 5 is a perspective view of the electronic control and power module of the machine of FIG. 1.
Figure 6:
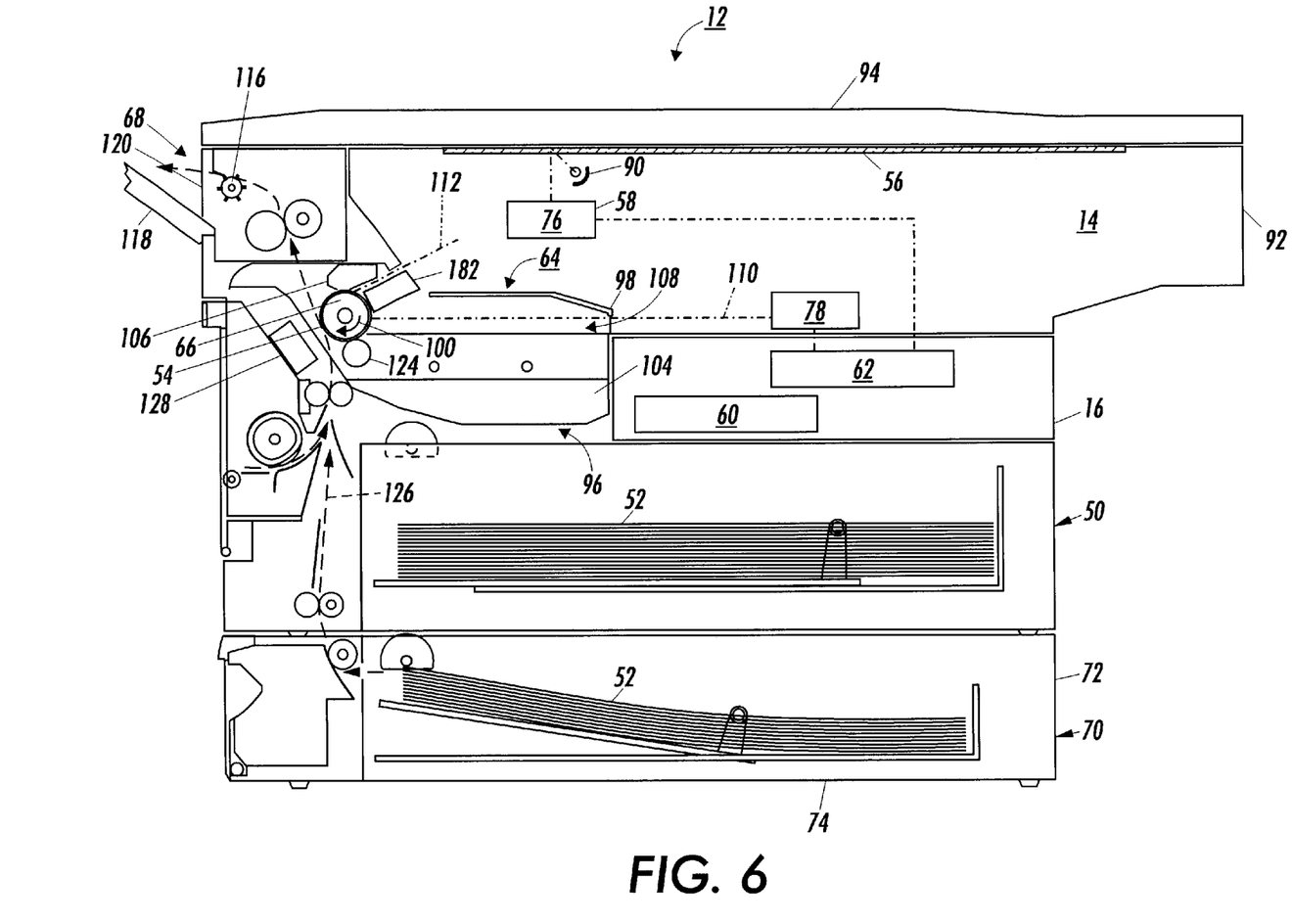
FIG. 6 is a schematic illustration of the process elements of the machine of FIG. 1.

The device for receiving a document image 14 in such a machine further includes a platen 56 for positioning a document having an original image to be reproduced and an imaging element 58 for creating a latent image of the original image of the document positioned on the platen 56. The device 16 for controlling the image receiving and transferring device 14 includes an electronic control and power supply (ECS/PS) elements 60 and 62 for providing power and logic control to the various devices and elements of the reproduction machine 12. The device for transferring the document image 14 comprises a customer replaceable process cartridge (CRU) module 64 containing a photoreceptor 66 and elements for forming a toner image on the photoreceptor 66. The machine 12 further includes a fuser device 68 for fixing the toner image of the document image on the copy sheet. Preferably each of the devices is separately framed and arranged in mutually aligning machine modules in accordance with the teachings of the Stickney et al. Patents which are specifically incorporated by reference herein. Additional details of a preferred electrostatographic machine can be obtained by reference to the Stickney et al Patents.

The compact machine 10 is preferably frameless, meaning that it does not have a separate machine frame to which electrostatographic process subsystems are assembled. The reproduction machine 10 is comprised of a number of individually framed, and mutually aligning machine modules that variously include pre-aligned electrostatographic process subsystems.

Preferably, the machine 10 comprises a pair of copy sheet input modules 50 and 70. Further details of the copy sheet input modules of this invention can be found in the Stickney et al. Patents. In accordance with this embodiment of the present invention, the module frame 72 includes an outer cover and thus serves as a base of the machine 12.

The machine 12 next comprises a framed electronic control and power supply (ECS/PS) module 16 that as shown mounts onto, and is mutually aligned against the sheet input module 50. The ECS/PS module 16 includes all controls and power supplies (not shown) for all the modules and processes of the machine 12. It also includes a controller 60, and an image processing pipeline element 62 for managing and processing raw digitized images from a Raster Input Scanner (RIS) 76 or a printer output signal from a computer, and for generating processed digitized images from the Raster Output Scanner (ROS) 78.

The ECS/PS module 16 also includes harnessless interconnect boards and inter-module connectors (not shown), that provide all power and logic paths to the rest of the machine modules 14, 50, 64, 68, 70, etc. An interconnect board (PWB) 82 connects the ECS controller 60 and power supply boards 84 and 86 to the inter-module connectors 80, as well as locates all of the connectors to the other modules in such a manner that their mating connectors will automatically plug into the ECS/PS module 16 during final assembly of the machine 12. Importantly, the ECS/PS module 16 includes a module frame 88 to which the active components of the module 16 as above are mounted, and which forms a covered portion of the machine 12, as well as locates and mutually aligns, and mounts to adjacent framed modules, such as the CIM 50 and the imager module 14.

The machine 12 also comprises the separately framed imager module 14, which mounts over, and mutually aligns against the ECS/PS module 16. As shown, the imager module 14 comprises the RIS 76, ROS 78, a light source 90, and an imager module frame 92. The RIS 58 is of conventional design and preferably converts hard copy images to electronic bit maps or digitized images. The imager module 14 includes electrical connection means (not shown) connecting the RIS 76 to an image processing element (IPP) 78 for processing the digitized images. The imaging module 14 has a platen 56 and a top cover 94. In accordance with this embodiment of the present invention, the imaging module has a module frame 92 which forms a covered portion of the machine 12 upon assembly, as well as locates to, mutually aligns with, and mounts to the ECS/PS module 16, and the other adjoining modules.

The framed copy sheet input modules 50 & 70, the ECS/PS module 16, and the imager module 14, as mounted above, define a cavity 96. The machine 12 preferably includes a customer replaceable, all-in-one CRU or process cartridge module 64 that is insertably and removably mounted within the cavity 96, and in which it is mutually aligned with, and operatively connected to, the framed copy input module 50, ECS/PS 16 and imager module 14. The CRU or process cartridge module 64 generally comprises a module housing 98, a photoreceptor 66 rotatable in the direction of the arrow 100, a charging subassembly 102, a developer subassembly 104, and a cleaning subassembly 106 for removing residual toner as waste toner from a surface of the photoreceptor 66. The module housing subassembly 98 of the process cartridge module 64 includes a first path 108 for receiving an ROS beam 110 onto the photoreceptor 66, and a second path for receiving an erase light 112 onto the photoreceptor 66.

As further shown, the machine 12 includes a framed fuser module 68, that is mounted above the process cartridge module 64, as well as adjacent an end of the imager module 14. The fuser module 68 comprises a pair of fuser rolls 114, and at least an exit roll 116 for moving an image carrying sheet through, and out of, the fuser module 68 into an output tray 118. The fuser module also includes a heater and temperature sensing means (not shown), paper path handling baffles(not shown), and a modular frame 120 to which the active components of the module 68, as above, are mounted, and which forms a covered portion of the machine 12, as well as locates, mutually aligns, and mounts to adjacent framed modules, such as the imager module 14 and the process cartridge module 64.

The machine 10 includes a separately framed drive module 122 (as shown in FIG. 4) that comprises a main drive motor, a motor control board and interconnect boards and gears for transmitting mechanical power to various framed modules requiring drive, such as the process cartridge module 64, the copy sheet input module 50, and the fuser module 68.

With particular reference to FIG. 6. operation of an imaging cycle of the machine 12 using the all-in-one process cartridge module 64 generally can be briefly described as follows. Initially, a photoreceptor in the form of a photoconductive drum 66 of the customer replaceable machine (CRU) or process cartridge module 64 rotating in the direction of the arrow 100, is charged by the charging subassembly 102. The charged portion of the drum is then transported to an imaging/exposing light 110 from the ROS 78 which forms a latent image on an image bearing surface of the photoreceptive drum 66. The latent image, as is well known, corresponds to an image of a document positioned on a platen 56 via the imager module 14. It will also be understood that the imager module 14 can easily be changed from a digital scanning module to a light lens imaging module if desired.

The portion of the drum 66 bearing a latent image is then rotated to the developer subassembly 104 where the latent image is developed with developer material such as with charged single component magnetic toner using a magnetic developer roller 124 of the process cartridge module 64. The developed image on the drum 66 Is then rotated to a near vertical transfer point 54 where the toner image is transferred to a copy sheet 52 or substrate fed from the CIM 50 or the auxiliary CIM 70 along a copy sheer or substrate path 126. In this embodiment the detac device 128 is provided for charging the back of the copy sheet 52 or substrate at the transfer point 54, in order to attract the charged toner image from the photoconductive drum 66 onto the copy sheet 52 or substrate. The copy sheet 52 or substrate with the transferred toner image thereon, is then directed to the fuser module 68, where the heated fuser rolls 130 fuse and fix the toner image onto the copy sheet 52 or substrate. The copy sheet 52 or substrate then, as is well known, may be selectively transported to the output tray 118. The part of the drum 66 from which the developed toner image was transferred is then advanced to the cleaning subassembly 106 where residual toner and residual charge on the drum 66 are removed therefrom. The imaging cycle of the machine 12 can then be repeated as desired.

While the invention has been described by reference to a printer/copier the aforenoted apparatus and process could be applied to a computer printer, facsimile machine or optical scanner by eliminating certain elements of the copier and adding various circuit boards and software to accomplish the desired functions. For example, to make the machine 12 into a computer printer one could eliminate the imaging elements comprising the lamp 90 and the RIS 76. The control module 16 receives the printer output signal from the computer and provides an appropriate signal to the ROS 78. In most other respects the machine 12 would be similar to the one described with respect to the printer/copier embodiment. For a fax function such a computer printer would include added fax circuitry if only computer generated faxes were desired. If it were desired to scan documents for inputting an image or for faxing the scanned image then the imaging elements which were deleted from the copier machine would be included in the machine 12 and appropriate circuit boards and software added to provide the additional functions.

In each of these cases in accordance with this invention the user interface panel device 10 would be changed by full replacement or by addition of a module 18 as described above to provide buttons and displays appropriate for the functions of the machine 12.

In accordance with a further embodiment of the invention a process is provided for upgrading a reproduction machine 12 having one or more of the following functions: electronic printer, copier, facsimile machine, or optical scanner or enhancements of any of these functions. The machine is upgradable to include any of the functions or enhancements it does not already posses.

The process comprises: providing a reproduction machine as described above; upgrading the controlling device by adding additional control elements to it so that it can support the additional desired functions not already possessed by the machine; and upgrading the detachable user interface panel 12 by removing it and replacing it with a different user interface panel device which is configured to include the additional desired functions not already possessed by the machine or by adding an additional detachable user interface panel element to the original interface panel.

The process preferably includes the step of selecting the number of buttons on the upgraded user interface panel and their functions to provide the original and additional desired functions. The process preferably also includes the step of providing an LCD display on the upgraded user interface panel and selecting the size and display features for the display to provide the original and additional desired functions.

It should be understood that the foregoing description is only illustrative of the invention. Various alternatives and modifications can be devised by those skilled in the art without departing from the spirit of the invention. Accordingly, the present invention is intended to embrace all such alternatives, modifications and variances which fall within the spirit and scope of the appended claims.

What is claimed is:

1. A reproduction machine having one or more of the following functions: electronic printer, copier, facsimile machine, or optical scanner, said machine being upgradable to include any of said functions it does not already posses, said machine including the following elements:
    (a) a device for receiving a document image in an electronic format and for transferring said document image in viewable form to a substrate;
    (b) a device for controlling said image receiving and transferring device to provide one or more desired machine functions selected from optical scanning, electronic printing, copying, facsimile, improvements to the foregoing functions, or a combination of said functions, said control device being capable of being upgraded to provide one or more said functions it does not possess; and
    (c) a detachable user interface panel device coupled to said controlling device, said user interface panel device being selected from one of the following interchangeable user interface panel devices: (I) a scanner user interface panel, (ii) an electronic printer user interface panel device (iii) a copier user interface panel device, (iv) a facsimile machine user interface panel device or (v) a user interface panel device configured to include a combination of at least two of said scanner, printer, copier or facsimile functions; said selected user interface panel being upgradable to a different one of said interchangeable user interface panel devices by replacement with a different user interface panel device or by the addition of a further user interface panel device, said detachable user interface panel device comprising a detachable panel supporting a plurality of buttons for actuation by the user, a local microprocessor for assisting the controlling device in providing the desired machine functions and an electrical connector for connecting the panel device and the devices supported by it to the controlling device.

2. A machine as in claim 1 wherein said detachable user interface panel device further comprises a display for communicating with the user, said electrical connector connecting the display to the controlling device.

3. A machine as in claim 2 wherein the number of said buttons and their function and arrangement are selected to provide the desired function or functions.

4. A machine as in claim 2 wherein said display comprises an LCD display having a size and display features appropriate to said desired function or functions.

5. A machine as in claim 2 which comprises an electrostatographic machine and said electrical connector is a harnessless electrical connector.

6. A machine as in claim 5 wherein said electrostatographic machine further includes a copy sheet input element for holding and supplying copy sheets to a toner image transfer point of said transfer device to receive a toner image thereon and wherein said device for receiving a document image further includes a platen for positioning a document having an original image to be reproduced and an imaging element for creating a latent image of the original image on a document positioned on said platen and wherein said device for controlling said image receiving and transferring device includes an electronic control and power supply (ECS/PS) element for providing power and logic control to the various devices and elements of the reproduction machine.

7. A machine as in claim 6 wherein said device for transferring said document image comprises a customer replaceable process cartridge (CRU) module containing a photoreceptor and elements for forming a toner image on said photoreceptor, said machine further including a fuser device for fixing a toner image of said document image on said copy sheet.

8. A machine as in claim 6 wherein each of said devices is separately framed and arranged in mutually aligning machine modules.

9. A process for upgrading a reproduction machine having one or more of the following functions: electronic printer, copier, facsimile machine, or optical scanner, said machine being upgradable to include any of said functions it does not already posses, said process comprising:
    (A) providing a reproduction machine having:
        (a) a device for receiving a document image in an electronic format and for transferring said document image in viewable form to a substrate;
        (b) a device for controlling said image receiving and transferring device to provide one or more desired machine functions selected from scanning, electronic printing, copying, facsimile, improvements to the foregoing functions, or a combination of said functions, said control device being capable of being upgraded to provide one or more said functions it does not posses; and
        (c) a detachable user interface panel device coupled to said controlling device, said user interface panel device being selected from one of the following interchangeable user interface panel devices: (i) a scanner user interface panel, (ii) an electronic printer user interface panel device, (iii) a copier user interface panel device, (iv) a facsimile machine user interface panel device, or (v) a user interface panel device configured to include a combination of at least two of said scanner, printer, copier or facsimile functions; said selected user interface panel being upgradable to a different one of said interchangeable user interface panel devices by replacement with a different user interface panel device or by the addition of a further user interface panel device;
    (B) upgrading said controlling device by adding additional control elements to said controlling device to support additional desired functions not already possessed by said machine; and
    (C) upgrading said detachable user interface panel by removing said detachable user interface panel device and replacing it with a different user interface panel device which is configured to include said additional desired functions not already possessed by said machine, said detachable user interface panel device comprising a detachable panel supporting a plurality of buttons for actuation by the user, a local microprocessor for assisting the controlling device in providing the desired machine functions and an electrical connector for connecting the panel device and the devices supported by it to the controlling device.

10. A process as in claim 9 wherein instead of replacing said detachable user interface panel an additional detachable user interface panel element is added to the original interface panel.

11. A process as in claim 9 further including the step of selecting the number of said buttons and their function to provide the desired original and additional desired functions.

12. A machine as in claim 9 wherein said upgraded user interface is provided with an LCD display and further including the step of selecting the size and display features for said display to provide said desired original and additional functions.

13. A machine as in claim 1 wherein the added local microprocessor assists the control device in providing the desired added machine functions.

14. A process as in claim 9 wherein the added local microprocessor provides assistance to the control device in providing the desired added machine functions.

* * * * *